United States Patent [19]
Plunkett

[11] 4,023,083
[45] May 10, 1977

[54] TORQUE REGULATING INDUCTION MOTOR SYSTEM

[75] Inventor: Allan Barr Plunkett, Erie, Pa.

[73] Assignee: General Electric Company, Erie, Pa.

[22] Filed: Apr. 14, 1975

[21] Appl. No.: 568,120

[52] U.S. Cl. ............................. 318/227; 318/230; 318/231

[51] Int. Cl.[2] ...................................... H02P 5/40

[58] Field of Search ................. 318/227, 230, 231

[56] References Cited

UNITED STATES PATENTS

| | | | |
|---|---|---|---|
| 3,500,158 | 3/1970 | Landau et al. | 318/227 |
| 3,512,067 | 5/1970 | Landau | 318/227 |
| 3,593,083 | 7/1971 | Blaschke | 318/227 |
| 3,855,509 | 12/1974 | Wright | 318/227 |

*Primary Examiner*—Gene Z. Rubinson
*Attorney, Agent, or Firm*—A. S. Richardson, Jr.; C. W. Helzer

[57] ABSTRACT

A torque regulating alternating current induction motor control system comprising a motor flux sensing coil arrangement mounted on the induction motor stator for sensing the actual flux produced across the rotor-stator air gap of the motor and deriving a motor flux voltage signal proportional to the actual motor flux. An integrating circuit integrates the voltage signal to obtain a feedback sensed actual motor flux signal representative of the actual air gap flux. An actual torque feedback circuit converts the actual air gap flux and stator current signal to an actual value of torque feedback control signal. A first feedback control loop is responsive to the actual torque feedback control signal and a command value of torque signal and controls the frequency of operation of a power converter supplying the induction motor. A second feedback control loop also responsive to the feedback sensed actual value of flux converts the flux signal into a (V/Hz) voltage control signal for maintaining a substantially controlled value of rotor-stator air gap flux level. The first and second feedback control loops are interconnected and coact to maintain operation of the induction motor at a controlled value of torque.

The actual torque feedback circuit includes a flux signal processing circuit for deriving from the output motor flux signals respective direct and quadrature axes flux signal components and combines these signals with direct and quadrature axes motor current signal components in multiplier circuits for multiplying the quadrature axis flux signal by the direct axis motor current signal and for multipying the direct axis flux signal by the quadrature axis motor current signal. A summing circuit sums the two products to derive an output actual value of torque developd by the induction motor in accordance with the expression $T = K(\psi_d i_{qs} - \psi_q i_{ds})$. The system is designed primarily for use with a three-phase, variable voltage, variable speed, alternating current induction motor intended for traction motor drives and makes available a new and novel actual torque measuring arrangement for use in such systems.

34 Claims, 7 Drawing Figures

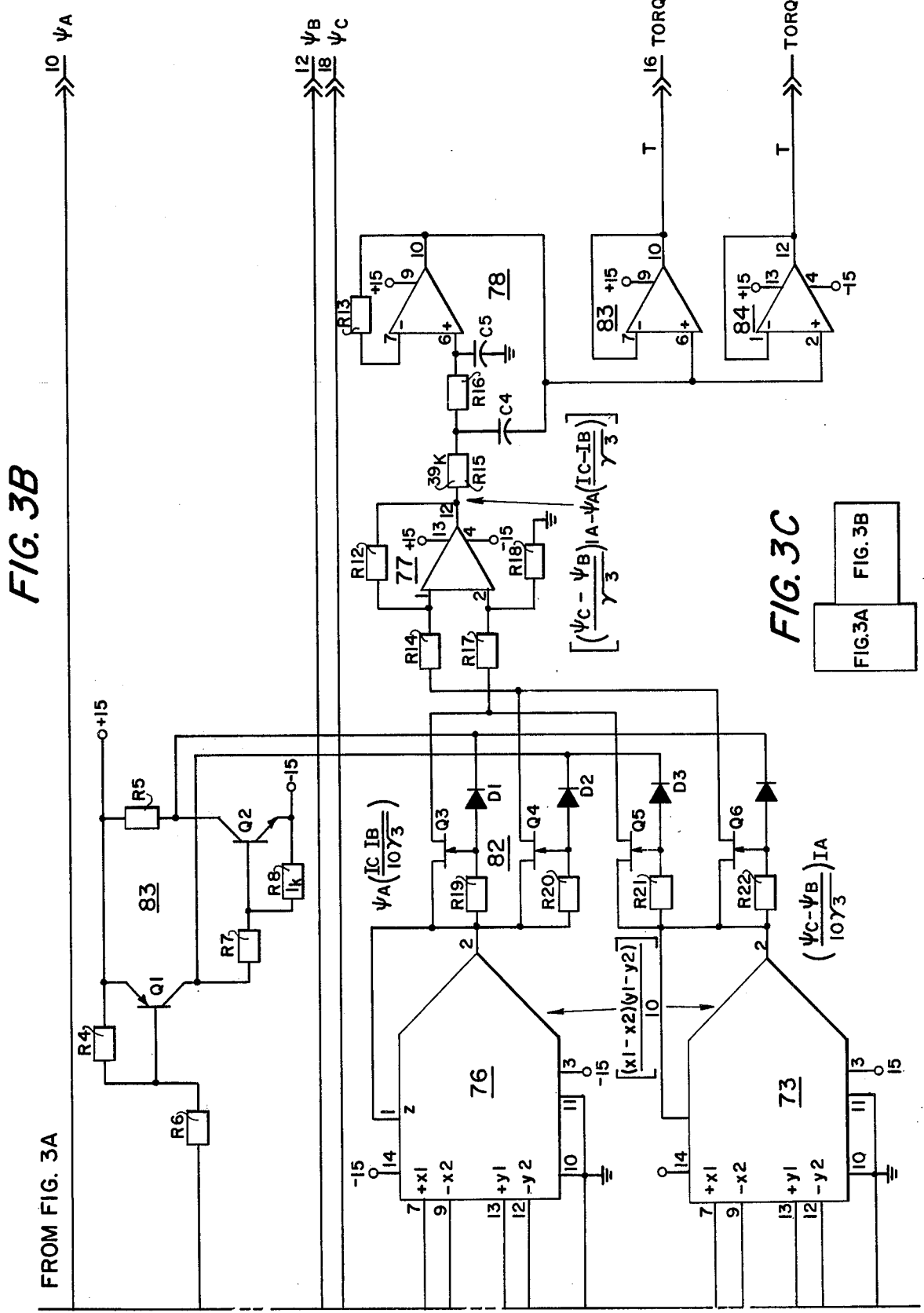

TORQUE REGULATING INDUCTION MOTOR SYSTEM

BACKGROUND OF INVENTION

1. Field of Invention

This invention relates to a new and improved torque regulating alternating current induction motor control system.

More particularly, the invention relates to a torque regulating control system for use with variable voltage, variable frequency, induction motors of the type normally used for traction motor drives, and wherein improved control of motor torque is achieved by actually sensing the true motor flux and deriving from the sensed true motor flux an actual torque feedback signal that is employed in regulating the operation of the induction motor.

2. Background Problem

In traction motor drive systems such as are employed in transit cars, electric locomotives and the like, it is desirable to closely control or regulate the actual output torque of variable voltage, variable speed induction motors used in such traction motor drive systems. This requirement is due to the fact that the actual output torque is the primary factor controlling acceleration, motoring speed, deceleration, braking speed, etc., and primarily influences passenger safety and comfort.

There are a number of known mechanical torque regulating methods which employ mechanical means for measuring the actual torque of an induction motor. Such mechanical torque measuring arrangements require physical space for obtaining a mechanical torque measurement and thereafter convert the mechanical measurement to a corresponding electrical signal proportional to actual torque. All of these known mechanical torque measuring arrangements are quite prone to failure, and require extra space in the drive between the motor and the gear unit normally driven by an induction traction motor. Since such space is at a premium and not normally available in high speed transit cars, electric locomotives and the like without considerable sacrifice, the known mechanical torque measuring methods have not been widely used.

Known prior art electrical methods of torque regulation used with variable voltage, variable speed induction motor traction drives have not heretofore employed the true or actual motor torque in an all electrical, closed feedback loop control system. Many attempts have been made to try to regulate torque in an all electrical system in the past; however, all such known systems heretofore have used some component of the motor stator current as a measure of the level of torque that the motor is producing. Such known electrical systems also may have employed the motor slip, the actual motor speed, the actual flux level and, perhaps, the real component of the motor stator current to regulate the motor torque. One such known electrical method of torque regulation is described in U.S. Pat. No. 3,593,083 — issued July 13, 1971 for an APPARATUS FOR PROVIDING THE PILOT VALUES OF CHARACTERISTICS OF AN ASYNCHRONOUS THREE PHASE MACHINE— by Felix Blaschke, Inventor, and utilizes a two axes steady state equivalent circuit technique of torque analysis employing sensed stator line current as the measure of torque. This known system is sensitive to changes to the internal parameters of the motor due to changes in temperature, and can result in an error in the actual torque calculation by as much as 25% or more.

Difficulty is encountered with previously known electrical methods of motor torque regulation which sensed and utilized the stator current as a measure of the motor torque due to the fact that the resultant torque feedback control signal derived from such system not only is sensitive to the power converter wave form, but is quite susceptible to losses in the motor due to stator resistance changes, changes in the physical parameters of the rotor due to heat, harmonic losses or harmonics occurring in the line voltage supplying the motor. Consequently, such known electrical methods of torque measurement and regulation have not been entirely satisfactory.

SUMMARY OF INVENTION

It is, therefore, a primary object of the present invention to provide a new and improved electrical torque regulating induction motor control system wherein improved control over the torque produced by the induction motor is achieved by actually sensing the true motor flux and deriving from the sensed true motor flux an actual torque feedback signal that is employed in regulating operation of the induction motor.

Another object of the invention is the provision of a new and improved electrical torque measuring arrangement using electrical techniques for measuring the actual torque of an alternating current induction motor and which is capable of use with motor control systems of the above-described type.

In practicing the invention, a torque regulating alternating current induction motor control system is provided which comprises sensing coil means mounted on the induction motor stator for sensing the actual flux produced across the rotor-stator air gap of the motor and for deriving an output motor flux voltage signal proportional thereto. Integrating circuit means are provided for integrating the voltage signal to obtain a feedback sensed actual motor flux signal representative of the actual air gap flux. An actual torque feedback circuit means is supplied with the actual air gap motor flux signal and an input stator line current signal, and derives therefrom an output actual value of torque feedback control signal. This actual torque feedback control signal is supplied through a first feedback control loop means to control the frequency of operation of a power converter circuit driving the induction motor in a manner to maintain a substantially controlled value of stator excitation voltage frequency. Second feedback control loop means also is provided which is responsive to the feedback sensed actual flux signa and controls the input power level to the power converter means to maintain a substantially controlled level of rotor-stator air gap flux. The combined effect of the first and second feedback control loops maintain operation of the induction motor at a controlled value of torque.

The actual torque feedback circuit means comprises an actual flux signal processing circuit coupled to the output from the integrating circuit for deriving from the actual flux signal respective direct and quadrature axes flux signal components $\psi_d$ and $\psi_q$. Motor current sensing means are provided for sensing the motor stator line current and deriving output motor current signals that are supplied to a motor current signal processing circuit for deriving respective direct and quadrature axes motor current signals $i_{ds}$ and $i_{qs}$. A first multiplier circuit supplied by the flux signal processing circuit and the motor current signal processing circuit multiplies the quadrature axis flux signal and the direct axis motor current signal and derives an ($\psi_q i_{ds}$) representative of their product. A second multiplier circuit coupled to the actual flux signal processing circuit and the motor current signal processing circuit multiplies the direct axis flux signal and the quadrature axis motor current signal and derives an ouptut ($\psi_d i_{qs}$) representative of their product. A summing circuit coupled to the output of both the first and second multiplier circuits sums the outputs together and derives a resultant output signal which is representative of the actual value of the torque developed by the motor.

The first feedback control loop comprises a torque command circuit for deriving an input command value of torque control signal representative of the desired value of torque to be developed by the induction motor. A torque summing circuit is provided which is supplied with both the input command value of torque and the feedback actual value of torque control signal and derives a torque error signal representative of any difference. A torque error signal processing circuit means is coupled to the output of the summing circuit for deriving from the torque error signal a compensated slip frequency control signal. The slip frequency signal is then converted into a stator excitation voltage frequency control signal that is applied through appropriate control circuits to control the frequency of operation of the power converter supplying the induction motor.

The second feedback control loop means preferably comprises rectifier and averaging circuit means responsive to the output from the integrating circuit for deriving an average actual value of motor flux feedback control signal. Motor flux command circuit means are provided for supplying an input command value of motor flux control signal representative of a desired value of motor flux to be developed across the rotor-stator air gap of the induction motor. A motor flux signal summing circuit means is responsive to both the input command vlue of motor flux and the average actual value of motor flux feedback signal and derives a motor flux error signal representative of any difference. This motor flux error signal is then used for controlling the power level of operation of the power converter circuit means supplying the induction motor in a manner to maintain the actual average flux feedback signal substantially equal in value to the desired command value of flux signal.

In a preferred form of the invention, the system is designed for operation with three-phase, variable speed, variable voltage, alternating current induction motors for use in traction drive systems of the type employed in electric transit cars, electric locomotives and the like.

BRIEF DESCRIPTION OF THE DRAWINGS

These and other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGS. 3A and 3B comprise a detailed circuit diagram of the novel torque sensing and measuring arrangement shown in the functional block diagram of FIG. 2;

DETAILED DESCRIPTION OF PREFERRED EMBODIMENTS

Figure 1:
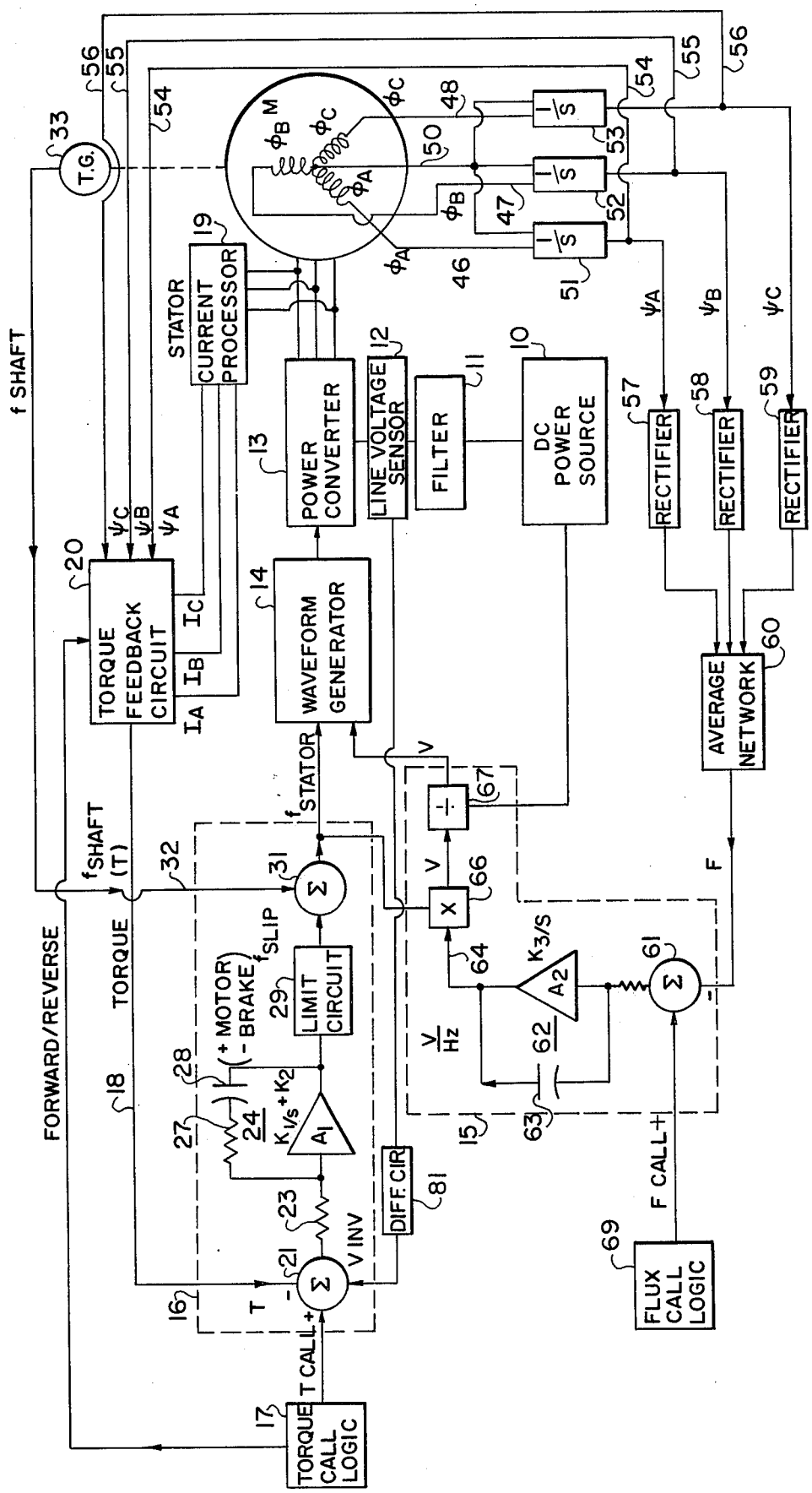
FIG. 1 is a functional block diagram of a new and improved electrical torque regulating induction motor control system constructed in accordance with the invention.

FIG. 1 is a functional block diagram of a new and improved torque regulating induction motor control system constructed in accordance with the invention. In FIG. 1, an alternating current induction motor is shown at M and preferably comprises a three phase variable voltage, variable speed induction motor of the type used in traction motor drive systems for electric transit cars, electric locomotives, and the like. It should be understood, however, that the torque regulating control system comprising the invention can be used with any type of variable speed or constant speed motor drive system employing induction motors wherein it is desired to provide close regulation of the torque produced by the induction motor. However, it is particularly advantageous for use with variable voltage, variable speed traction motor drive systems for electric transit cars, electric locomotives, or other similar conveyances wherein it is desired to maintain close control over the torque produced by the motor in order to assure safe and comfortable starting, acceleration, motoring, deceleration and braking (either dynamic or regenerative) under both favorable and adverse conditions which are unpredictable and where passenger comfort and safety is of prime importance.

The particular induction motor M shown schematically in FIG. 1 depicts a three-phase, variable speed, variable voltage induction motor where for simplicity, the stator and rotor windings of the motor have not been illustrated. The induction motor M has been specially designed to include a plurality of motor flux sensing coils $\phi_A$, $\phi_B$, $\phi_C$ for sensing the actual flux produced across the rotor-stator air gap of the motor in a manner disclosed more fully in co-pending U.S. application serial No. 525,613; filed Nov. 20, 1974; entitled APPARATUS FOR REGULATING MAGNETIC FLUX IN AN AC MOTOR, J. P. Franz and A. B. Plunkett, inventors assigned to General Electric Company, the disclosure of which is hereby incorporated in its entirety. A brief description of the manner in which the flux sensing coils $\phi_A$, $\phi_B$, $\phi_C$ are mounted within motor M will be provided more fully hereinafter in connection with FIGS. 4 and 5 of the drawings. However, for the present purpose it is sufficient to state that the sensing coils each sense the actual flux produced in the air gap between the respective sets of rotor-stator phase windings with which it is related and derive output voltage signals that are proportional to the rate of change of flux across the rotor-stator air gap.

The output voltage signals derived by the sensing coils $\phi_A$, $\phi_B$, $\phi_C$ are supplied through conductors 46, 47 and 48 to integrating circuits 51, 52 and 53, respectively. The integrating circuits 51, 52 and 53 are each connected to the coil neutral by conductor 50 and function to integrate the line-to-neutral voltage of the respective flux sensing coils $\phi_A$, $\phi_B$, $\phi_C$. The integrating circuits 51, 52 and 53 are conventional, known integrating circuits and perform the following integration: emf = $(d/dt) \int_S \overline{B} \cdot \overline{dS}$ where S equals the area enclosed by the line integral of the electric field and $\overline{B}$ equals the magnetic flux density vector. As a result of the integration the total flux for each set of phase windings is obtained as set forth in the expression: $n\psi = emf\ dt = \int_S \overline{B} \cdot \overline{dS}$, and results in the production of signals $\psi_A$, $\psi_B$, $\psi_C$ that comprise feedback sensed actual motor flux signals representative in both magnitude and phase of the actual air gap flux produced in the vicinity of the centers of the respective phase windings of induction motor M.

The sensed actual flux feedback signals $\psi_A$, $\psi_B$, $\psi_C$ are supplied over conductors 54, 55 and 56, respectively, to one set of input terminals of a torque feedback circuit 20. Torque feedback circuit 20 has an additional set of input terminals for receiving feedback line current signals $I_A$, $I_B$, $I_C$ derived by a line current processor circuit 19 and which are representative of the value of the stator excitation current supplied to the respective phases of the stator windings of induction motor M. Stator current processor circuit 19 may comprise conventional current transformers for deriving the desired feedback line current signals $I_A$, $I_B$, $I_C$ for each of the stator phase windings. The torque feedback circuit 20 will be described more fully hereinafter with respect to FIGS. 2 and 3 of the drawings. At this point in the disclosure, however, it is sufficient to state that it constitutes a processing circuit for processing the respective actual value of motor flux feedback signals $\psi_A$, $\psi_B$, $\psi_C$ together with the line current feedback signals $I_A$, $I_B$, $I_C$, and to derive respective direct and quadrature axes flux signal components $\psi_d$, $\psi_q$, and respective direct and quadrature axes motor current signals $i_{ds}$, $i_{qs}$. The torque feedback circuit then serves to multiply the quadrature axis flux signal and the direct axis motor current signal, and to multiply the direct axis flux signal and the quadrature axis motor current signal, and thereafter sum the products to derive a resultant output torque signal $T = (\psi_d i_{qs} - \psi_q i_{ds}) K$ representative of the actual value of the torque T developed by the induction motor M. This resultant feedback torque signal then is supplied over a feedback conductor 18 to one of the inputs of a summing circuit 21.

The summing circuit 21 may comprise any conventional, known summing or differential amplifier circuit such as those described in Chapters 1 and 2 of the reference textbook *Operational Amplifiers — Design and Application* by Tobey, Graeme and Huelsman, McGraw-Hill Book Company, 1971. In addition to the actual torque feedback signal T, summing circuit 21 has supplied to a second input terminal an input command value torque control signal supplied from a torque command logic circuit 17. This input command value of torque signal is representative of a desired value of torque to be developed by the induction motor M. Summing circuit 21 combines the command value of torque with the actual value of torque signal T, and derives an output torque error signal representative of the polarity and magnitude of any difference.

This torque error signal is processed in the first feedback control loop comprised generally by the elements contained in the dotted outline box 16 and which includes the summing circuit 21 and a processing circuit 24. The processing circuit 24 comprises an operational amplifier $A_1$ which may be a conventional, commercially available, integrated circuit amplifier of the type described in Chapter 8 of the above textbook entitled *Operational Amplifiers—Design and Application* by Tobey, Graeme and Huelsman, published by McGraw-Hill Book Company, 1971. The transfer function designed into operational amplifier $A_1$ is determined primarily by input resistor 23 and feedback elements comprised by resistor 27 and capacitor 28 which are adjusted to provide the operational amplifier $A_1$ with an integral plus proportional transfer characteristic corresponding to the function $(K_1/S) + K_2$ as described in the textbook by D'Azzo and Houppis, entitled "Feedback Control System Analysis and Synthesis", published by McGraw-Hill Book Company, 1960. Thus, it will be appreciated that the processing circuit 24 comprised by operational amplifier $A_1$ operates to derive from the torque error signal a compensated signal which by definition shall be treated as a desired slip frequency signal $f_{SLIP}$. The desired slip frequency signal $f_{SLIP}$ obtained at the output of processing circuit 24 is supplied through a limit circuit 29, and may then be applied directly to control the operation of the induction motor M, if such an arrangement be desired, as will be discussed hereinafter. However, it is preferred that the desired slip frequency signal $f_{SLIP}$ be supplied to a second or speed summing circuit 31 also included in and comprising a part of the first feedback control loop means 16 controlling induction motor M. Speed summing circuit 31 is similar in construction and characteristics to the summing amplifier circuit 21, and, in addition to the slip frequency signal $f_{SLIP}$, has supplied to it a second input feedback speed signal $f_{SHAFT}$ derived from a tachometer generator 33 or other similar speed sensor. The feedback speed signal $f_{SHAFT}$ is representative of the actual speed of the induction motor rotor shaft measured in Hertz.

Summing circuit 31 sums together the slip frequency and actual speed feedback signals and derives at its output a speed control signal $f_{STATOR}$ which is representative of a desired or command value of stator excitation frequency. The command stator frequency control signal $f_{STATOR}$ is supplied as the frequency controlling input signal to a wave form generator circuit 14. Wave form generator 14 may comprise any suitable known wave form generator capable of responding to two input control direct current signals representative of a desired value of frequency and of a desired output power level, and thereafter producing an output signal having a substantially sinusoidal wave form whose frequency is determined by the control signal $f_{STATOR}$ and whose amplitude is determined by a second input power level controlling signal V to be described more fully hereinafter.

Suitable designs for the wave form generator circuit 14 are described in Chapter 10 of the above-referenced textbook entitled *Operational Operational Amplifers —Design and Application* by Toby, Graeme and Huelsman. While a sinusoidal output wave form from the wave form generator 14 is preferred, other wave shapes may be generated and utilized for triggering the power controlling devices of a power converter circuit 13 coupled to the output from wave form generator 14 and that in turn supplying excitation currents to the three-phase stator windings of induction motor M. The magnitude of the excitation currents supplied from power converter 13 to the stator windings of induction motor M is sensed by the current processor 19 as described previously for deriving the feedback sensed actual value of stator line current for each of the phase windings $I_A$, $I_B$, $I_C$ and supplying the same to the torque feedback circuit 20.

From the foregoing description it will be appreciated that the actual torque feedback circuit 20 in conjunction with the first feedback control loop means comprised generally by the elements enclosed in the dotted outline box 16, operates to control the stator excitation voltage frequency of the stator excitation currents supplied to the three-phase windings of induction motor M by power converter 13. As will be described more fully hereinafter, the second feedback control loop means shown generally by the elements contained within the dotted outline box 15, is responsive to the feedback sensed actual flux signal derived by the flux sensing coils $\phi_A$, $\phi_B$, $\phi_C$, and operates to derive an output voltage control signal V which is applied to the input wave form generator 14. The voltage control signal V in conjunction with the frequency control signal $f_{STATOR}$ operate to control the nature of the trigger signals supplied by the wave form generator 14 to power converter 13 in such a manner as to maintain a substantially controlled value of excitation voltage frequency and amplitude so as to maintain a substantially controlled motor rotor-stator air gap flux level while maintaining operation of the induction motor M at a controlled value of torque.

The power converter 13 may comprise any suitable, known power converter such as a pulse width modulated inverter, a current controlled inverter or some other similar power inverter circuit for converting direct current power supplied from a direct current power source 10 through a filter 11 and line voltage sensor 12 to the power converter 13. Where the induction motor M comprises a variable speed, variable voltage induction motor used in the traction drive system of a transit car, electric locomotive or the like, the direct current power source 10 may comprise a third rail fed from power substations strategically placed along the railway right-of-way and supplying substantially constant direct current excitation power through filter 11 to the power converter 13. The line filter 11 is utilized to minimize the effect of transient voltage spikes and the like occurring in the DC power source 10 and to minimize interference with any signalling system, and to provide a stiff direct current voltage source for the power converter 13. If desired, the power converter 13 could comprise a cycloconverter operating from a suitable alternating current source. In such an arrangement, the DC power source 10 and the filter 11 would be replaced with a suitable AC source and filter and the power converter 13, instead of comprising an inverter, would comprise a cycloconverter.

Before describing the torque feedback circuit 20 in further detail, it is important to explain the differences between the present technique of torque measurement and known prior art methods. As stated earlier, there are methods of mechanically measuring the actual shaft torque developed by an induction motor and using that measurement as the feedback. However, all of the known mechanical methods of measuring torque are prone to failure and require additional physical space in the drive between the motor and the gear unit and, hence, are not satisfactory, particularly for use in transit car drives where the extra space just is not available.

While there are a number of known electrical methods for measuring the motor torque, none are entirely satisfactory, especially at low speeds where the resistance loss in the motor stator is a significant part of the total power that is supplied to the motor. The previously known electrical methods of regulating motor torque generally involve measurement of the current supplied to the motor stator windings and conversion of the stator current measurement into an indicia of torque produced by the motor. These techniques have the difficulty of being insensitive to changes in the wave form of the stator excitation current supplied by the power converter, particularly to harmonic effects on the motor, and also are quite susceptible to error due to losses in the motor introduced by changes in the stator resistance as well as changes in the physical parameters of the motor due to heating. Further, these known electrical torque measuring techniques tend to ignore transient effects in going from one speed to a different speed. These deficiencies are due at least in part to the fact that prior art methods of measuring motor torque electrically, employ steady state equivalent circuit methods of analysis which overly simplify the problem. These methods of analysis generally assume steady state equivalent circuit conditions wherein torque produced by the motor is calculated by sensing the values of rotor current, measurement of the stator excitation current, or whatever. The difficulty with these known methods is that they are only applicable to steady state conditions after all transients have died out, and do not accommodate harmonic effects directly, nor the fact that each harmonic has its own equivalent circuit that is different from the assumed steady state model.

Equation 1 set forth below provides an accurate measure of the true torque of an induction motor irrespective of harmonic effects in the wave form of the excitation voltage current supplied to the motor or transient effects produced by changes in voltage/current or frequency (motor speed) at which the motor is operated. The equation is not new, but belongs to the same family as the torque equation described previously in a textbook entitled *Electrical Machinery* (second edition) by Fitzgerald and Kingsley, published by McGraw-Hill Publishing Company, 1961, page 293. This equation gives true motor torque, that is to say, the electro-magnetic torque produced by the actual motor electromagnetic flux across the air gap between the stator and rotor, and is not affected by harmonics in the excitation voltage/current wave form, stator resistor changes, or any changes in the motor parameters due to temperature changes, etc., because it provides a measure of directly produced torque. Harmonics in the stator excitation line voltage/current, wave form changes, changes in excitation frequency (speed) and the like have no effect on the actual torque measurement provided. If the motor responds to harmonics in the supply voltage, and produces harmonic torque, the actual torque feedback signal derived with this equation will give the actual harmonic torque produced. Accuracy of the torque measurement does hinge, however, on having accurate flux sensing coils mounted in the motor so as to obtain a true measurement of the electromagnetic flux produced in the air gap between the stator and rotor of the motor.

$$T = K(\psi_d i_{qs} - \psi_q i_{ds}) \quad (1)$$

where:

T = Torque
K = Proportionality constant which is related primarily to the number of phases and poles in the motor and the base frequency
$i_{ds}$ = Actual motor line current in direct axis
$i_{qs}$ = Actual motor line current in quadrature axis
$\psi_d$ = Actual motor air gap flux in direct axis
$\psi_q$ = Actual motor air gap flux in quadrature axis
Note: The flux values $\psi_d$ and $\psi_q$ are expressed in units of voltage, the symbol $\psi$ representing the product of flux linkage and the base frequency (in radians per second) of the motor.

In the present application, as a matter of design choice, a three-phase alternating current induction motor has been employed having three stator phase windings A, B and C excited by polyphase alternating voltage sequenced in the order A-B-C. The quadrature axis has been chosen to be in the same direction as phase A of the induction motor to provide terms $\psi_q$ and $i_{qs}$. The direct axis is constructed by resolving phases B and C into a single variable which will be the same as $i_{ds}$ and $\psi_d$. With these assumptions, equation (1) resolves as follows:

$$T = \frac{K}{\sqrt{3}}(\Psi_C - \Psi_B)I_A - \frac{K}{\sqrt{3}}\Psi_A(I_C - I_B) \quad (2)$$

Figure 2:
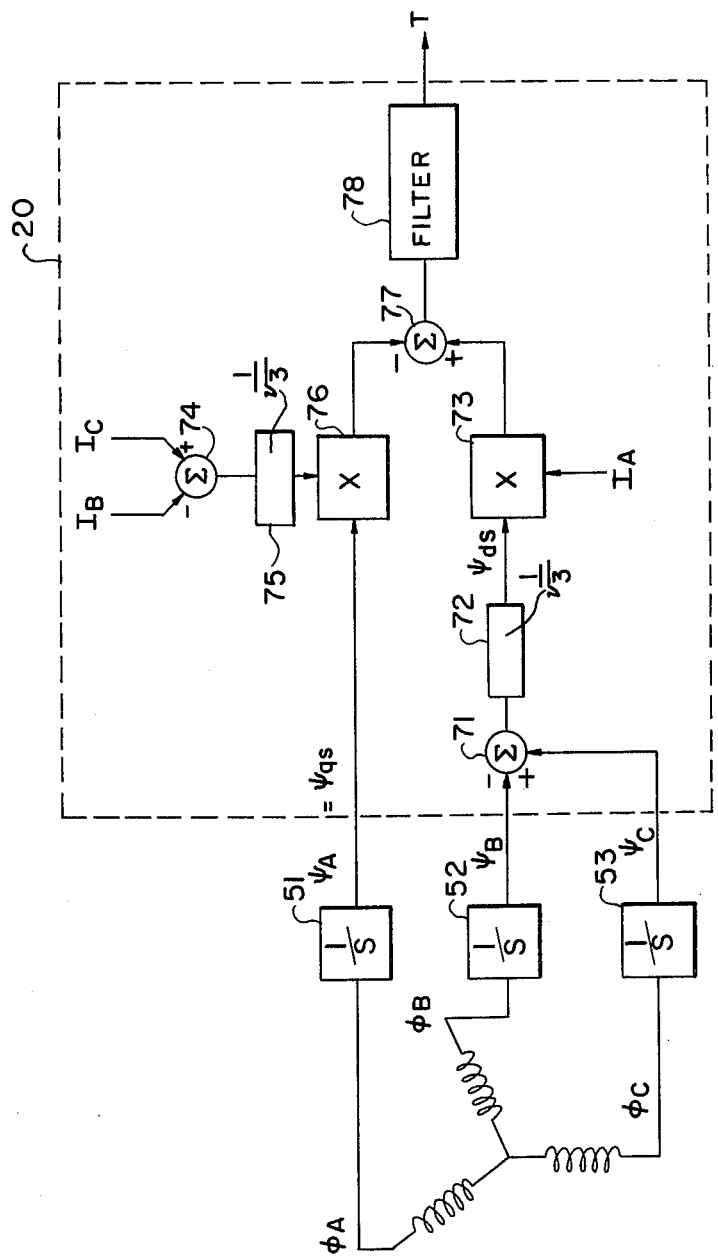
FIG. 2 is a functional block diagram of a novel torque sensing and measuring arrangement utilized in and comprising a part of the torque regulating control system shown in FIG. 1.

FIG. 2 is a simplified, functional block diagram illustrating the construction of the torque feedback circuit 20 for implementing equation (2) above. As shown in FIG. 2, each of the separate flux sensing coils $\phi_A$, $\phi_B$, $\phi_C$ has its voltage output signal supplied through respective integrating circuits 51, 52 and 53 to derive the feedback sensed actual flux signals $\psi_A$, $\psi_B$, $\psi_C$ representative of the actual air gap flux produced in the air gap between the rotor and stator of the induction motor upon excitation of the respective phases of the stator windings (not shown). As stated above, by design choice the quadrature axis has been chosen to be in the same direction as phase A and, hence, the actual flux signal $\psi_A$ represents the quadrature axis flux signal $\psi_{qs}$ and the phase A line current $I_A$ represents the quadrature axis line current $i_{qs}$. The direct axis flux signal and line current are constructed by resolving phases B and C into a single variable. This is achieved by adding the $\psi_B$ and $\psi_C$ flux signals in a summing circuit 71 and supplying the output through a circuit 72 that introduces the constant proportionality factor (K/$\sqrt{3}$) identified in the equation (2) above and provides the direct axis flux signal $\psi_d$ at its output. In a similar manner, the phase B and C line currents $I_B$ and $I_C$ are summed together in a summing circuit 74 and the resultant output supplied through a circuit 75 for again introducing the constant factor (K/$\sqrt{3}$) to thereby provide the direct axis current $i_{ds}$ at the output of the filter 75. The direct axis line current and quadrature axis flux signal are multiplied together in a multiplier 76 to provide the product ($\psi_q i_{ds}$) which is the second term in equation (1). Similarly, the quadrature axis line current and direct axis flux signal are multiplied in a multiplier 73 to provide the product ($\psi_d i_{qs}$) which is the first term of equation (1). The two products appearing at the outputs of the multipliers 73 and 76 are summed together in a summing circuit 77 and the resultant output signal applied through a filter 78 which smooths the output of the summer 77 and produces the resultant average torque signal: T = K ($\psi_d i_{qs} - \psi_q i_{ds}$) pursuant to equation (1). In this equation K is a constant determined by the number and the area of the motor stator teeth, the number of turns on the sensing coils and the gain of the integrators 51, 52 and 53.

Figure 3A:
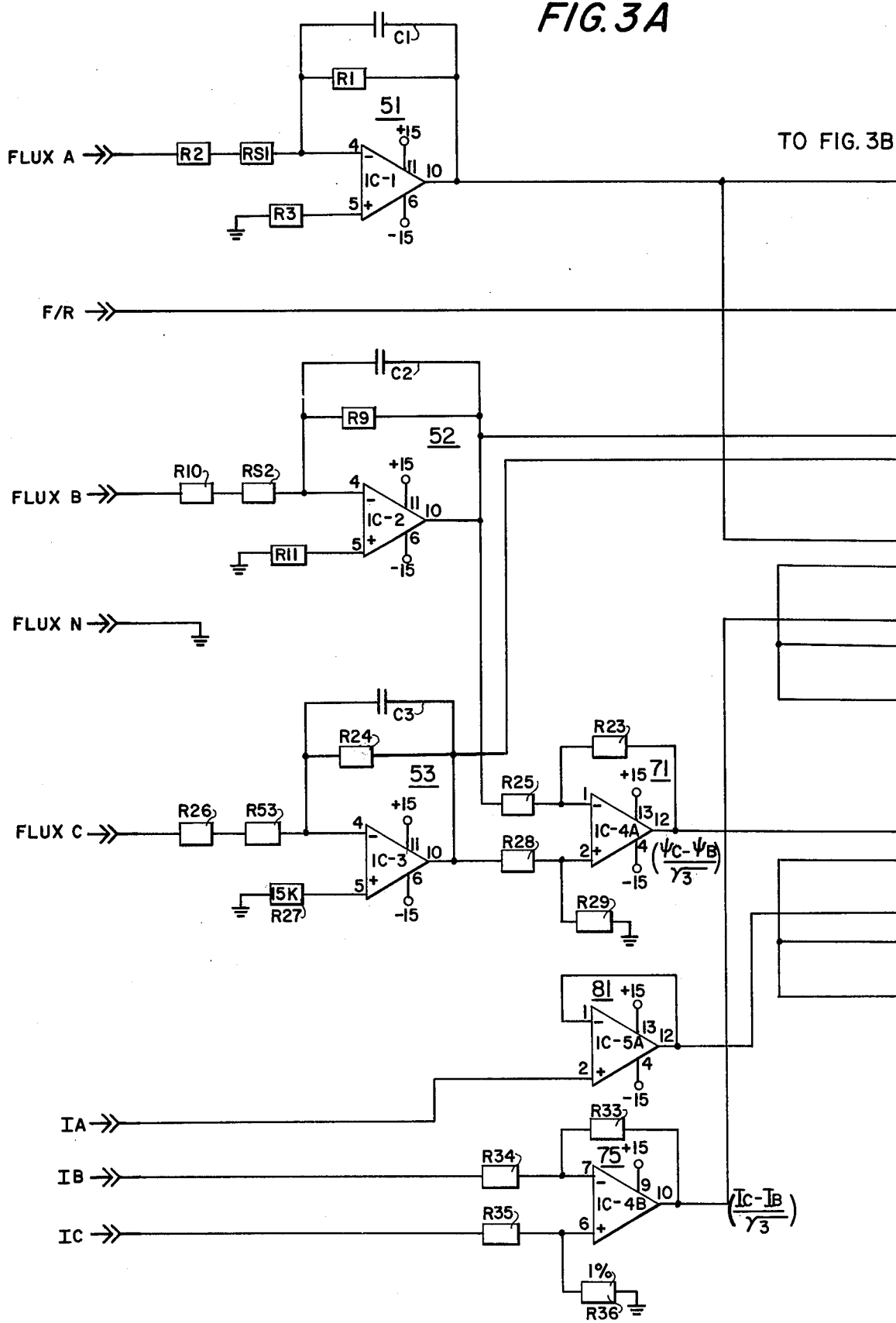

FIG. 3 is a detailed circuit diagram illustrating a preferred form of construction for the torque feedback circuit 20. In FIG. 3, the three integrating circuits 51, 52 and 53 are shown in the upper left hand margin of the drawing and are supplied with the input flux signals derived from the motor flux sensing coils mounted in the induction motor stator. The integrating circuits 51, 52 and 53 comprise conventional, commercially available, monolithic integrated circuit operational amplifiers such as the LM 107 manufactured and sold by National Semiconductor Corp. and described in its LINEAR INTEGRATED CIRCUITS data handbook. Pursuant to the above-discussed convention, the phase A flux and current signals are chosen as the quadrature axis flux and current signals, respectively. The output of flux integrating circuit 51 is supplied directly to one input terminal of the multiplier circuit 76. The multiplier circuits 76 and 73 are both conventional, commercially available, monolithic integrated circuit multipliers such as the AD 532 SD manufactured and sold by Analog Devices, Inc. The outputs from the two integrating circuits 52 and 53 are combined in the summing circuit 71 which again comprises a conventional, commercially available, monolithic integrated circuit operational amplifier such as the 747 manufactured and sold by the Motorola Semiconductor Products, Inc. as described in a data book issued by that company entitled — LINEAR INTEGRATED CIRCUITS. At the output of the summing circuit 71 a signal proportional to $$\left(\frac{\Psi_C - \Psi_B}{\sqrt{3}}\right)$$

is obtained and is supplied to one of the input terminals of the multiplier circuit 73. The phase A line current $I_A$ is supplied directly to one input terminal of an integrated circuit operational amplifier 81 which can be similar to IC Amp 71 and whose output is supplied directly as a second input to the multiplier circuit 73. The two remaining line currents $I_B$ and $I_C$ are summed together in the output of a summing circuit 75 comprised by a conventional, commercially available, monolithic 747 integrated circuit operational amplifier whose output signal is proportional to the value $$\left(\frac{I_C - I_B}{\sqrt{3}}\right)$$

and is supplied as the second input to the first-mentioned multiplier circuit 76.

The two multiplier circuits 76 and 73 are designed to perform the multiplication operation $$\left[\frac{(X_1 - X_2)(Y_1 - Y_2)}{10}\right] \text{ where } \Psi_A = X_1 \text{ and } \left(\frac{I_C - I_B}{\sqrt{3}}\right) = Y,$$

and $X_2$ and $Y_2 = 0$. The multiplier 73 performs the same multiplication operation where the value $$\left(\frac{\Psi_C - \Psi_B}{\sqrt{3}}\right) = X_1,$$

and $I_A = Y_1$, and $X_2$ and $Y_2 = 0$. The output signal appearing at the output of the multiplier 76 represents the product $$\Psi_A \left(\frac{I_C - I_B}{10\sqrt{3}}\right)$$

and the output signal appearing at the output of multiplier 73 represents the product $$\left(\frac{\Psi_C - \Psi_B}{10\sqrt{3}}\right)I_A.$$

It can be shown that the two outputs are a-c quantities consisting of the same double frequency components and oppositely poled d-c components that are proportional to motor torque, whereby the magnitude of their difference is a true measure of torque.

The output product signals from multipliers 73 and 76 are supplied through a polarity switching network 82 comprised by two separate sets of field effect transistors having their respective gate electrodes connected to the outputs from a pair of polarity reversing driver amplifiers 83. The driver amplifiers 83 are in turn controlled by an input forward or reverse command signal supplied from the torque command logic circuit 17 shown in FIG. 1. The polarity reversing switches 82 are provided in order to change the polarity of the product signals supplied as inputs to the summing circuit 77 to accommodate forward and reverse movement of the traction motor drive system including the induction motor M. It will be appreciated that, when a transit car, locomotive or other vehicle driven by the induction motor is going in reverse as opposed to forward, the output of the torque feedback circuit must still provide an accurate indication of the true torque. That is, the output of the torque measuring circuit must be positive as the shaft of the motor is twisted in one direction, and negative if the shaft is twisted in the other direction. Twisting of the shaft in the first direction may correspond to an accelerating or constant speed motoring condition and twisting of the shaft in the opposite direction would then correspond to a decelerating or braking condition. Accordingly, if the transit car is then driven in a reverse direction as opposed to forward, a sign changer must be introduced at some point in the system in order to convert the feedback torque signals to the proper polarity as defined by the above convention. By this means, it is assured that the feedback torque signal from circuit 20 always is positive while the car is accelerating or motoring and negative while decelerating or braking regardless of whether the transit car is moving forward or in reverse. The switching circuit 82 is provided to satisfy this requirement.

The product output signal supplied from multipliers 73 and 76 through the switching network 82 is applied to the input of a summing circuit 77 which again comprises a conventional, commercially available, monolithic integrated circuit operational amplifier such as the 747 manufactured and sold by the Motorola Semiconductors Products, Inc. as described in that Company's LINEAR INTEGRATED CIRCUITS data book. The summing circuit sums together the two product terms appearing at the output of the multipliers 76 and 73 to derive the resultant output actual torque signal $$T = \left(\frac{\Psi_C - \Psi_B}{\sqrt{3}}\right)I_A - \Psi_A\left(\frac{I_C - I_B}{\sqrt{3}}\right)$$

which is representative of the actual output torque being produced by the motor. To filter out its undesired harmonic component, this resultant output torque signal is averaged in an output filter circuit 78 which may comprise an integrated circuit operational amplifier of conventional construction such as the 747. The averaged output torque signal value is supplied through output driver amplifiers 83 and 84 for supplying the actual sensed torque signal T back to the input of the feedback loop. The resultant feedback actual torque signal T appearing at the output of the driver amplifiers 83 and 84 is an accurate representation of the actual motor torque and is not affected by motor parameter changes, by temperature changes, by slip frequency changes in the motor due to rotor resistance changes, by harmonics or by changes in the flux level of the motor due to changes in input power or speed, and accurately portrays the actual torque being developed by the motor at any given instant of time.

Figure 4:
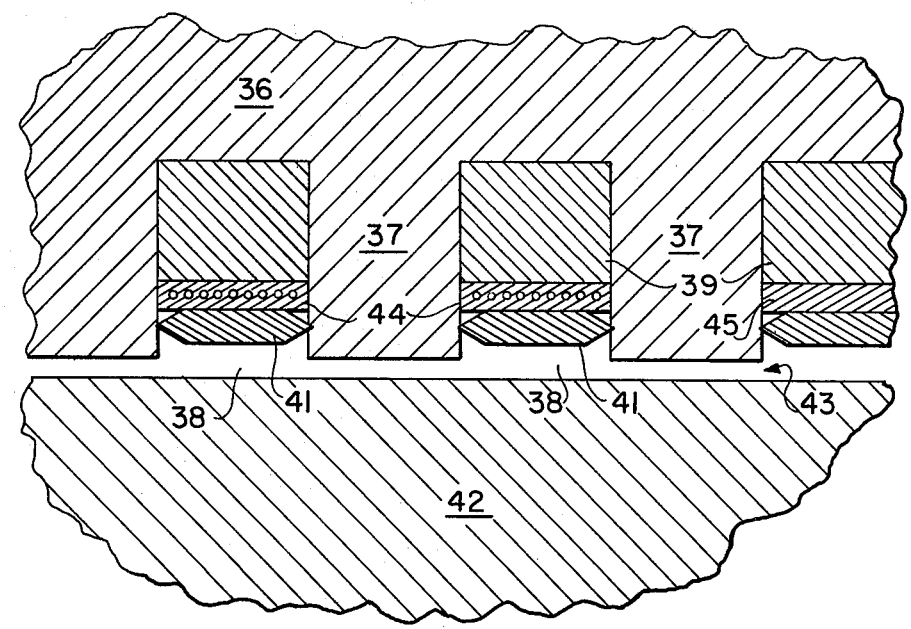
FIG. 4 is an elemental sectional view through a portion of the stator and rotor of an induction motor specially designed for use with the torque control system of the present invention.
Figure 5:
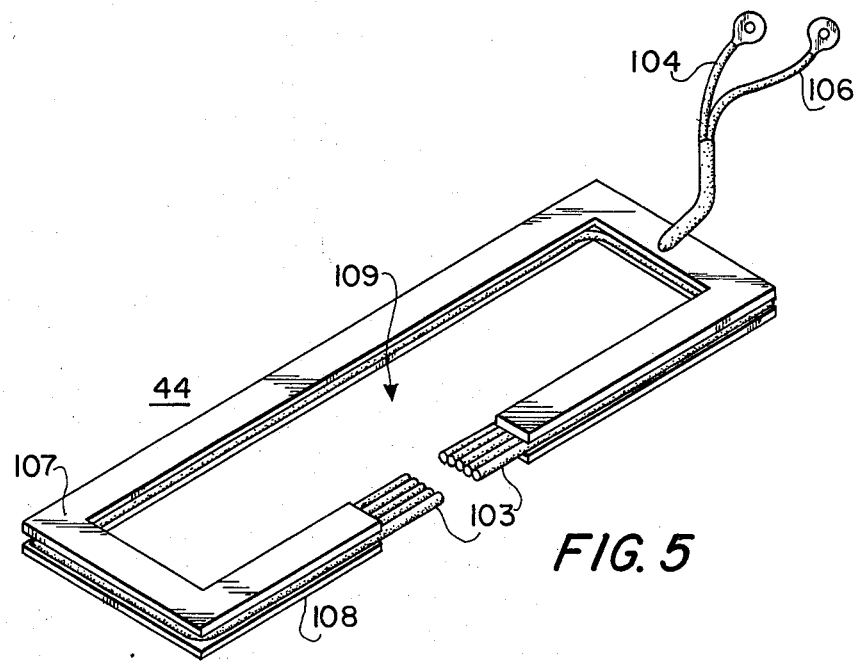
FIG. 5 is a schematic, perspective view of one set of flux sensing coils designed for use in the flux sensing and measuring arrangement of FIGS. 1 and 2, and shows the sensing coils removed from their normally mounted position on the induction motor stator.

As stated earlier, the obtainment of an accurate actual value of torque signal from the torque measuring and feedback circuit comprising a part of the present invention, depends greatly on accurately sensing the value of electromagnetic flux produced in the air gap between the rotor and stator of the induction motor. Because of this requirement, it is essential that the motor be specially designed to provide sensing coils for sensing the flux in the air gap space. A suitable arrangement for this purpose is illustrated in FIGS. 4 and 5 of the drawings wherein a fragmentary section of an induction motor stator is shown at 36 and a portion of the rotor is shown at 42. The motor stator 36 may be of conventional design and includes alternate circumferentially spaced teeth 37 formed by slots 38 with the slots 38 having the main stator winding coils 39 supported therein and secured by wedges 41 in a conventional manner. The air gap space is defined as that space between the stator 36 and the rotor 42 and is the space in which it is desired to maintain the electromagnetic flux at a controlled value. To accomplish this, flux sensing coils 44 are wound around one or more of the teeth 37 formed on the motor stator 36 so as to sense the change of magnetic flux flowing through the stator teeth. Preferably, the coil 44 is positioned in the center of the flux belt associated with the main coils of the corresponding phase of the thre-phase stator windings. As a consequence of this arrangement, changes in the electromagnetic flux passing through the teeth and crossing the air gap will link the sensing coil and induce an output voltage signal which is proportional to the rate of change of flux. The resultant output voltage signal provides an accurate measure of the actual electromagnetic motor flux produced in the air gap.

FIG. 5 is a perspective view of one of the sensing coils 44 removed from its mounting on the stator teeth as shown in FIG. 4. Each of the sensing coils 44 is comprised by a plurality of turns 103 of a conductor that are formed in a manner to define a rectangular shape central opening and terminate in two terminal leads 104 and 106. Preferably, a number of turns 103 are provided in order to obviate the need for a buffer amplifier which might be required if only a few turns were used. The maximum output signal voltage developed by the sensing oil depends primarily on the stator tooth area enclosed by the sensing coil and the number of turns. The turns 103 preferably are covered on each side by thin layers of insulating material 107 and 108 which have formed therein a rectangular opening 109 coextensive with the central opening defined by the turns 103 and designed to fit over the stator teeth 37 as shown in FIG. 4. The sensing coil arrangement 44 is placed in the slots 38 over the main stator winding coils 39 and then a slot wedge 41 is inserted to retain both sets of coils in the slots and provide mechanical protection. With an arrangement of this type, accurate sensing of the electromagnetic flux produced in the air gap between the stator and rotor of the motor will be assured.

Returning to FIG. 1 of the drawings, it will be recalled that in the preferred form of the invention, a tachometer generator 33 derives a feedback actual speed signal that is supplied to the summing circuit 31 along with the slip frequency signal developed by operational amplifier $A_1$ in torque signal processing circuit 24. It has been determined that the actual flux and torque regulation obtainable with the control system comprising the present invention, makes it possible to delete the speed feedback so that it is no longer necessary. It has been determined that the control system will regulate the flux level and torque values of the induction motor accurately without any knowledge of the actual motor speed or slip. Thus, accurate speed feedback is made somewhat redundant and no longer necessary and is desirable only in order to find the actual motor speed (frequency) should the power be shut off for some reason or other. If desired, the control system could be designed to search for and find at what speed the motor is actually running and to supply it the correct frequency under the influence of the flux and torque feedbacks alone, thereby obviating any need whatsoever for the speed feedback. In the presently disclosed embodiment, however, the speed feedback has been included to facilitate tracking of the motor speed by the control system as changes in speed of the induction motor are called for by an operator of the system.

As described earlier, the overall system is comprised by two major control loops. The first control loop employs the feedback actual torque signal from torque feedback circuit 20 and is further comprised generally by the elements shown in dotted outline box 16 to control the motor frequency. The second feedback control loop is shown generally by the elements within the dotted outline box 15 and controls the motor voltage. The motor voltage control loop has been described previously in considerable detail in the above-referenced co-pending U.S. Application Ser. No. 525,613 and in U.S. application Ser. No. 402,253 filed Oct. 1, 1973, A. B. Plunkett, Inventor, for METHOD AND APPARATUS FOR AUTOMATIC IR COMPENSATION, also assigned to the General Electric Company, (now U.S. Pat. No. 3,911,340, the disclosure of which also is incorporated herein by reference in its entirety. Hence, there is no need to describe the motor voltage control loop 15 in any great detail. Briefly, however, the motor voltage control loop utilizes the sensed actual motor flux signals $\psi_A$, $\psi_B$, $\psi_C$ developed at the output of the integrating circuits 51, 52 and 53. The respective motor flux signals are supplied through rectifier circuits 57, 58 and 59 to an averaging network 60 which sums and averages the motor flux signals to derive an output average motor flux signal F that is representative of the actual average motor flux developed by the motor M. This average motor flux signal F is supplied to a third summing circuit 16 in conjunction with an input command value of motor flux signal $F_{CALL}$ supplied from a flux call logic command circuit 69. The summing circuit 61 is similar in construction and operation of summing circuit 21 and compares the actual average motor flux signal F to the command value of flux $F_{CALL}$ to derive an output flux error signal representative of the polarity and magnitude of any difference.

The flux error signal from the output of summing circuit 61 is supplied to an integrator circuit 62 comprised by an operational amplifier $A_2$ that is similar in construction to operational amplifier $A_1$, but has the transfer characteristic ($K_3/S$) designed into it in order to make the flux error signal zero under steady state conditions.

The (V/Hz) control signal appearing at the output of operational amplifier $A_2$ is supplied to one input of a multiplier circuit 66. Multiplier circuit 66 has a second input to which the frequency command signal $f_{STATOR}$ appearing at the output of speed summing circuit 31, is supplied and functions to multiply these signals together to derive an output voltage control signal that may be applied directly to control the voltage input of the wave form generator 14. Mulitplier 66 may comprise a conventional, commercially available, integrated circuit multiplier such as those described in the above-referenced Graeme, Tobey and Huelsman text in Chapter 7, Section 7,5 or such as are described in a textbook entitled *Analog Computation* by Albert Jackson published by McGraw-Hill Book Company, 1960. The multiplier 66 operates to maintain a constant ratio of motor voltage to command excitation current frequency and results in the production of a controlled air gap flux for the induction motor. The cross-connection of the frequency control signal $f_{STATOR}$ from the speed control loop into the voltage control loop through the medium of multiplier 66 greatly improves the stability and response of the overall control system, especially during braking operations. Finally, by this expedient, the voltage control channel is not required to compensate for instananeous speed changes and, thus, does not require fast control action.

In addition to the multiplier 66, it is desirable to include in the voltage control loop a divider circuit 67, of conventional construction for compensating for DC line voltage changes, particularly if the power converter 13 comprises a pulse width modulated inverter. With this expedient, alternating current excitation voltage applied to induction motor M by the power converter 13 will be maintained substantially constant and independent of DC line voltage variations. This is achieved by reason of the fact that any line voltage variations will be cancelled out by appropriate compensation of the voltage control signal V derived at the output of the divider circuit 67 and supplied to control the voltage of power converter 13. The divider circuit 67 may be inserted either ahead of or following the multiplier 66 as shown in FIG. 1, and may be of any standard type such as the divider disclosed in the above-referenced textbook by Tobey, Graeme and Huelsman — Chapter 7, Section 7.5.7 or in the *Analog Computation* textbook by Albert Jackson.

An extra control feature which has been included in preferred embodiments of the control system utilizes a line voltage sensor 12 for sensing the value of the line voltage supplied by the DC source 10 through filter 11 to the power converter circuit 13. This sensed value of line voltage is differentiated by a differentiating circuit 81 and supplied as a third input to the frst summing circuit 21 in the first or torque feedback control loop that comprises the frequency control channel of the overall system. The differentiated value of the inverter input line voltage labelled $V_{INV}$ is used to stabilize the control loop action during braking, especially dynamic braking. This is particularly advantageous for transit car applications where the transfer function of the induction motor may not be as good as is needed, and in order to speed up the control response. The feedback differentiated line voltage greatly improves the speed of response and stability of the system and is discussed more fully in an article co-authored by the inventor and T. A. Lipo and entitled "New Methods of Induction Motor Torque Regulation" appearing in the conference record of the Industry Applications Society of Oct. 1974, copies available from the Institute of Electrical and Elctronic Engineers (IEEE) New York, N.Y.

As stated previously, the improved torque regulating induction motor control system comprising the present invention employs two major control loops, one of which controls the motor frequency and the other controls the motor voltage. The motor voltage control channel has been described previously in the above-referenced co-pending U.S. application Ser. No. 525,613. (See also co-pending application Ser. No. 402, 253, filed Oct. 1, 1973.) It utilizes a sensed value of the average motor flux as the feedback control signal. The error between the sensed average motor flux and a command value of motor flux drives an operational amplifier having a transfer function which integrates the error and converts it to produce a volts per Hertz control signal that is utilized to drive the power converter in a direction to zero the error. The volts per Hertz control signal preferably is supplied through a multiplier which multiplies it by the command value of motor frequency and, thereafter, may or may not be supplied through a voltage divider to compensate for line voltage changes. The output of the voltage divider, if used, is applied as the motor voltage command to the wave form generator supplying the power converter driving the motor.

The control loop which controls the frequency or speed of the motor uses sensed actual motor torque as the feedback control signal. The sensed actual motor torque is combined with a torque call or torque command signal in a summing circuit which derives an output error torque signal. This output error torque signal in the system disclosed is used as a desired motor slip frequency signal after appropriate compensation. The slip frequency signal is added to an actual shaft speed feedback signal to derive a motor stator frequency control signal. The use of the actual speed feedback signal is not absolutely essential in this system as discussed previously, because the motor is being operated in response to sensed true value of torque and sensed true value of flux, and will seek its own proper operating condition without the use of a tachometer generator or other actual speed feedback signal. Use of the actual speed feedback signal, however, does provide certain advantages to the ability of the control system to limit the motor slip and in starting or stopping the motor at the proper frequency without requiring searching while starting. The combined effects of the control results in accurate regulation of the torque produced by the motor.

The method of torque regulation disclosed herein for the first time, has been tested extensively and it has been found that it accurately controls induction motor air gap torque and is not adversely affected by motor parameter changes, by temperature changes, by slip frequency changes, by changes in the motor due to rotor resistance changes, or by changes in the flux level. Further, line or inverter harmonics or transient voltage spikes have no adverse effect on the sensed or measured actual value of torque fed back to the feedback control loop and do not adversely influence operation of the torque regulation control system in contrast to previously known electrical torque regulating schemes.

From the foregoing description, it will be appreciated that the invention provides a new and improved torque regulating induction motor control system wherein improved control over the torque produced by the induction motor is achieved by actually sensing the true motor flux and deriving from the sensed true motor flux an actual torque feedback signal that is employed in regulating operation of the induction motor. The improved true motor torque sensing and measuring circuit comprising a part of the system employs electrical techniques that readily may be utilized with practical induction motor traction drive systems employing variable voltage, variable frequency induction motors.

Having described one embodiment of a new and improved torque regulating induction motor control system having a novel actual motor torque sensing and measuring circuit according to the invention, it is believed obvious that other modifications and variations of the invention will be suggested to those skilled in the art in the light of the above teachings. It is, therefore, to be understood that changes may be made in the particular embodiments of the invention described which are within the full intended scope of the invention as defined by the appended claims.

What is claimed is:

1. An improved torque regulating control system for an alternating current induction motor having a stator and a rotor spaced from one another by an air gap, said stator including a winding adapted to be excited by a controllable source of electric power so as to produce electromagnetic flux across said air gap, wherein the improvement comprises:
   a. motor flux feedback means including means mounted on the motor stator adjacent to said air gap for sensing the actual flux produced across said air gap when said stator winding is excited and means coupled to said flux sensing means for deriving output actual flux signals representative in magnitude and phase of the actual air gap flux;

b. actual torque feedback circuit means responsive to said actual flux signals and to sensed motor stator line currents for deriving an actual value of torque feedback control signal;

c. first feedback control loop means responsive to said actual value of torque feedback control signal for controlling the operation of the power source so as to vary the frequency of stator excitation in a manner that maintains operation of the induction motor at a controlled value of torque; and d. second feedback control loop means responsive to said actual flux signals for controlling the power source so as to control the amplitude of stator excitation in a manner that produces a substantially controlled air gap flux level.

2. A torque regulating alternating current induction motor control system according to claim 1, wherein said actual air gap flux sensing means comprises a plurality of coils and said means coupled to said flux sensing means comprises integrating circuit means coupled to said coils, and wherein said actual torque feedback circuit means comprises, actual flux signal processing circuit means coupled to the output from said integrating circuit means for deriving from said actual flux signals respective direct and quadrature axes flux signal components $\psi_d$ and $\psi_q$, motor current sensing means for sensing the motor stator line current and deriving output current signals representative thereof, motor current signal processing circuit means coupled to said motor current sensing means for deriving from said output motor current signals respective direct and quadrature axes motor current signals $i_{ds}$ and $i_{qs}$, first multiplier circuit means coupled to said flux signal processing circuit means and said motor current signal processing circuit means for multiplying said quadrature axis flux signal and said direct axis motor current signal and deriving an output ($\psi_q i_{ds}$) representative of their product, second multiplier circuit means coupled to said actual flux signal processing circuit means and said motor current signal processing circuit means for multiplying said direct axis flux signal and said quadrature axis motor current signal and deriving an output ($\psi_d i_{qs}$) representative of their product, and summing circuit means coupled to said first and second multiplier circuit means for summing together the outputs thereof and deriving the resultant actual value of torque feedback control signal $T = (\psi_d i_{qs} - \psi_q i_{ds})$ representative of the actual value of the torque developed by the motor.

3. A torque regulating alternating current induction motor control system according to claim 2 for an alternating current induction motor adapted to be excited by alternating voltage supplied at desired frequency and amplitude to its stator winding by a controllable source of electric power comprising power converter circuit means, wherein said first feedback control loop means comprises torque command circuit means for supplying an input command value of torque control signal representative of a desired value of torque to be developed by the induction motor, torque summing circuit means supplied with said input command value of torque control signal and said actual value of torque feedback control signal for deriving a torque error signal representative of the magnitude and polarity of any difference, means for deriving a stator excitation voltage frequency control signal from said torque error signal, and means for applying said stator excitation voltage frequency control signal to control the frequency of operation of said power converter circuit means.

4. A torque regulating alternating current induction motor control system according to claim 3 further including means for deriving a feedback rotor speed signal representative of the actual speed of the rotor shaft, and speed summing circuit means serving to combine the actual rotor speed signal with the torque error signal for deriving said stator excitation voltage frequency control signal for controllling the frequency of operation of said power converter circuit means.

5. A torque regulating alternating current induction motor control system according to claim 2 for an alternating current induction motor adapted to be excited by alternating voltage supplied at desired frequency and amplitude to its stator winding by a controllable source of electric power comprising power converter circuit means, wherein said second feedback control loop means comprises rectifier and averaging circuit means responsive to the output from said integrating circuit means for deriving an average actual value of motor flux feedback signal, motor flux command circuit means for deriving an input command value of motor flux control signal representative of a desired value of motor flux to be developed by the induction motor, flux signal summing circuit means responsive to said average actual value of motor flux feedback signal and to said command value of motor flux control signal for combining said signals and deriving a motor flux error signal representative of the magnitude and polarity of any difference, and means responsive to said motor flux error signal for controlling operation of said power converter circuit means in a manner to maintain equality between the feedback actual average motor flux signal and the desired commmand value of motor flux signal and thereby maintain stable operation of the induction motor at a controlled value of torque.

6. A torque regulating alternating current induction motor control system according to claim 2, wherein the alternating current induction motor is a three-phase alternating current induction motor having three-phase windings wherein said plurality of coils comprises corresponding motor flux sensing coils $\phi_A$, $\phi_B$ and $\phi_C$, for each of the three-phase windings, and wherein the actual flux signal processing circuit means derives a first output signal ($\psi_A$) as the direct axis flux signal component and a second output signal $$\left(\frac{\Psi_C - \Psi_B}{\sqrt{3}}\right)$$

as the quadrature axis flux signal component, the motor current signal processing circuit means derives a first output signal ($I_A$) as the direct axis motor current signal and a second output signal $$\left(\frac{I_C - I_B}{\sqrt{3}}\right)$$

as the quadrature axis motor current signal, the first multiplier circuit means derives the product output signal $$\left(\frac{\Psi_C - \Psi_B}{\sqrt{3}}\right) I_A$$

the second multiplier circuit means derives the product output $$\Psi_A \left(\frac{I_C - I_B}{\sqrt{3}}\right),$$

and the torque summing circuit means derives the output torque signal $$\left(\frac{\Psi_C - \Psi_B}{\sqrt{3}}\right) I_A - \Psi_A \left(\frac{I_C - I_B}{\sqrt{3}}\right)$$

representative of the actual value of the torque developed by the induction motor.

7. A torque regulating control system according to claim 2 for an alternating current induction motor having a stator that includes polyphase windings adapted to be excited by a controllable source of polyphase electric power, wherein said plurality of flux sensing coils are respectively mounted around the stator at selected positions adjacent to said air gap, said positions being selected so that at least one of said coils is positioned in the center of a flux belt associated with a predetermined phase of said polyphase stator windings, and wherein said integrating circuit means comprises a plurality of integrators respectively coupled to said sensing coils.

8. A torque regulating alternating current induction motor control system according to claim 2, wherein said actual flux signal processing circuit means further comprises averaging means connected to the output of said summing circuit means for filtering out undesired harmonic components from said resultant actual value of torque feedback control signal.

9. A torque regulating control system according to claim 1 for an alternating current induction motor adapted to be excited by alternating voltage supplied at desired frequency and amplitude to its stator winding by a controllable source of electric power comprising converter circuit means.

10. A torque regulating alternating current induction motor control system according to claim 9, wherein said first feedback control loop means comprises torque summing circuit means supplied with an input command value of torque control signal representative of a desired value of torque to be developed by the induction motor and said actual value of torque feedback control signal for deriving a torque error signal representative of the magnitude and polarity of any difference, means for deriving from said torque error signal a stator excitation frequency control signal, and means for applying said stator excitation frequency control signal to control the operation of said power converter circuit means so that the frequency of the excitation alternating voltage supplied to the motor varies with the value of said stator excitation voltage frequency signal.

11. A torque regulating alternating current induction motor control system according to claim 10 further including means for deriving a feedback rotor speed signal representative of the actual speed of the rotor shaft and speed summing circuit means serving to combine the actual rotor speed signal with the torque error signal for deriving said stator excitation frequency control signal.

12. A torque regulating alternating current induction motor control system according to claim 9, wherein said second feedback control loop means comprises rectifier and averaging circuit means responsive to the output from said flux feedback means for deriving an average actual value flux feedback signal, motor flux command circuit means for supplying an input command value of motor flux control signal representative of a desired value of motor flux to be developed by the induction motor, flux signal summing circuit means responsive to said average actual value of motor flux feedback signal and to said command value of motor flux control signal for combining said signals and deriving a motor flux error signal representative of the magnitude and polarity of any difference, and means responsive to said motor flux error signal for controlling operation of said power converter circuit means in a manner to maintain equality between the feedback actual average motor flux signal and the desired command value of motor flux signal.

13. A torque regulating alternating current induction motor control system according to claim 12, wherein said first feedback control loop means comprises torque command circuit means for supplying an input command value of torque control signal representative of a desired value of torque to be developed by the induction motor, torque summing circuit means supplied with said input command value of torque control signal and said actual value of torque feedback control signal for deriving a torque error signal representative of the magnitude and polarity of any difference, means for deriving a feedback rotor speed signal representative of the actual speed of the motor rotor shaft, and speed summing circuit means responsive to said torque error signal and to said feedback rotor speed signal, said speed summing circuit serving to derive a stator excitation frequency control signal for controlling the frequency of operation of said power converter circuit means.

14. A torque regulating alternating current induction motor control system according to claim 13, further including multiplier circuit means responsive to said motor flux error signal and to said stator excitation frequency control signal for multiplying the stator excitation frequency control signal times the motor flux error signal and applying the product to control operation of the power converter circuit means for maintaining substantially constant loop gain and improved system stability with changes in speed of the induction motor.

15. A torque regulating alternating current induction motor control system according to claim 14, further including divider circuit means responsive to the output from said multiplier circuit means for dividing the product output signal thereof with a signal representative of variations in the line voltage of the primary power source supplying said power converter circuit means, and having the output thereof connected to control operation of said power converter circuit means to thereby compensate for line voltage changes occurring in the primary power source supplying the power converter circuit means.

16. A torque responsive alternating current induction motor control system according to claim 8, wherein said actual torque feedback circuit means comprises, actual flux signal processing circuit means coupled to the output from said flux feedback means for deriving from said actual flux signals respective direct and quadrature axes flux signal components $\psi_d$ and $\psi_q$, motor current sensing means for sensing the motor stator line current and deriving output motor current signals representative thereof, motor current signal processing circuit means coupled to said motor current sensing means for deriving from said output motor current signal respective direct and quadrature axes motor current signals $i_{ds}$ and $i_{qs}$, first multiplier circuit means coupled to said flux signal processing circuit means and said motor current signal processing circuit means for multiplying said quadrature axis flux signal and said direct axis motor current signal and deriving an output ($\psi_q i_{ds}$) representative of their product, second multiplier circuit means coupled to said actual flux signal processing circuit means and said motor current signal processing circuit means for multiplying said direct axis flux signal and said quadrature axis motor current signal and deriving an output ($\psi_d i_{qs}$) representative of their product, and summing circuit means coupled to said first and second multiplier circuit means for summing together the outputs thereof and deriving the resultant actual value of torque feedback control signal $T=(\psi_d i_{qs}-\psi_q i_{ds})$ representative of the actual value of the torque developed by the motor.

17. A torque regulating alternating current induction motor control system according to claim 16, further including multiplier circuit means responsive to said motor flux error signal and to said stator excitation frequency control signal for multiplying the stator excitation frequency control signal times the motor flux error signal and applying the product to control operation of the power converter circuit means for maintaining subtantially constant loop gain and improved system stability with changes in speed of the induction motor.

18. A torque regulating alternating current induction motor control system according to claim 17, further including divider circuit means responsive to the output from said multiplier circuit means for dividing the product output signal thereof with a signal representative of variations in the line voltage of the primary power source supplying said power converter circuit means, the output of said divider circuit means being connected to control operation of said power converter circuit means to thereby compensate for line voltage changes occurring in the primary power source supplying the power converter circuit means.

19. A torque responsive alternating current induction motor control system according to claim 18, further including limit circuit means coupled in the output of said torque summing circuit means in advance of the speed summing circuit means for limiting the torque error signal to predetermined safe ranges of values, a signal wave form generator responsive to the stator excitation frequency control signal produced at the output of the speed summing circuit means and to the output signal from said divider circuit means for deriving a controlled wave shape output signal for application to the power converter circuit means to control the operation thereof, line voltage sensor means interposed between primary source of electric power and the power converter circuit means for sensing voltage variations appearing therein, differentiating circuit means responsive to the output from said line voltage sensor means and having its output connected as a third input to said first mentioned torque summing circuit means along with the input command value of torque and actual torque feedback signal, and reversing switch means interconnected in said actual torque feedback circuit means and responsive to said torque command circuit means for controlling the polarity of the actual torque feedback control signal in response to forward and reverse directional movement of the alternating current induction motor.

20. A torque regulating alternating current induction motor control system according to claim 19, wherein the alternating current induction motor is a three-phase alternating current induction motor having three-phase windings wherein said flux sensing means comprises corresponding motor flux sensing coils $\phi_A$, $\phi_B$, and $\phi_C$, for each of the three-phase windings, and wherein the actual flux signal processing circuit means derives a first output signal ($\psi_A$) as the direct axis flux signal component and a second output signal $$\left(\frac{\Psi_C - \Psi_B}{\sqrt{3}}\right)$$

as the quadrature axis flux signal component, the motor current signal processing circuit means derives a first output signal ($I_A$) as the direct axis motor current signal and a second output signal $$\left(\frac{I_C - I_B}{\sqrt{3}}\right)$$

as the quadrature axis motor current signal, the first multiplier circuit means derives the product output signal $$\left(\frac{\Psi_C - \Psi_B}{\sqrt{3}}\right) I_A$$

the second multiplier circuit means derives the product output signal $$\Psi_A \left(\frac{I_C - I_B}{\sqrt{3}}\right),$$

and the torque summing circuit means derives the output torque signal $$\left(\frac{\Psi_C - \Psi_B}{\sqrt{3}}\right) I_A - \Psi_A \left(\frac{I_C - I_B}{\sqrt{3}}\right)$$

representative of the actual value of the torque developed by the induction motor.

21. A torque regulating control system according to claim 1 for an alternating current induction motor having a stator that includes polyphase windings adapted to be excited by a controllable source of polyphase electric power, wherein said motor flux feedback means comprises a plurality of sensing coils respectively mounted on said stator at selected positions adjacent to the stator-rotor air gap so that each coil has induced therein a voltage signal proportional to the rate of change of the actual air gap flux adjacent to its position, said motor flux feedback means further comprising a plurality of integrating circuit means coupled to said sensing coils, respectively, for deriving a plurality of output actual flux signals that are integrals of the voltage signals induced in the respective sensing coils.

22. A torque regulating control system according to claim 21 wherein at least one of said flux sensing coils is positioned in the center of a flux belt associated with a predetermined phase of said polyphase stator windings.

23. A torque regulating alternating current induction motor control system according to claim 1, wherein said actual torque feedback circuit means includes means for reversing the polarity of the actual value of torque feedback control signal to accommodate forward and reverse directional movement of the motor.

24. A new and improved torque measuring circuit for use in alternating current induction motor control systems including in combination motor flux sensing means for sensing the actual flux induced in the induction motor and deriving output motor flux signals, flux signal processing circuit means coupled to said motor flux sensing means for deriving from said output motor flux signals respective direct and quadrature axes flux signal components $\psi_d$ and $\psi_q$, motor current sensing means for sensing the motor stator line current and deriving output motor current signals representative thereof, motor current signal processing circuit means coupled to said motor current sensing means for deriving from said output motor current signals respective direct and quadrature axes motor current signals $i_{ds}$ and $i_{qs}$, first multiplier circuit means coupled to said first flux signal processing circuit means and said motor current signal processing circuit means for multiplying said quadrature axis flux signal and said direct axis motor current signal and deriving an output ($\psi_q i_{ds}$) representative of their product, second multiplier circuit means coupled to said flux signal processing circuit means and said motor current signal processing circuit means for multiplying said direct axis flux signal and said quadrature axis motor current signal and deriving an output ($\psi_d i_{qs}$) representative of their product, and summing circuit means coupled to said first and second multiplier circuit means for summing together the outputs thereof and deriving a resultant output signal $T=(\psi_d i_{qs}-\psi_q i_{ds})K$ representative of the actual value of the torque developed by the motor.

25. A torque measuring circuit according to claim 24, wherein the alternating current induction motor is a three-phase alternating current induction motor having three-phase windings and wherein the motor flux sensing means comprises corresponding motor flux sensing coils $\phi_A$, $\phi_B$, and $\phi_C$, for each of the three-phase windings, the flux signal processing circuit means derives a first output signal ($\phi_A$) as the direct axis flux signal component and a second output signal $$\left(\frac{\Psi_C - \Psi_B}{\sqrt{3}}\right)$$

as the quadrature axis flux signal component, the motor current signal processing circuit means derives a first output signal ($I_A$) as the direct axis motor current signal and a second output signal $$\left(\frac{I_C - I_B}{\sqrt{3}}\right)$$

as the quadrature axis motor current signal, the first multiplier circuit means derives the product output signal proportional to $$\left(\frac{\Psi_C - \Psi_B}{\sqrt{3}}\right)I_A$$

the second multiplier circuit derives a product output signal proportional to $$\Psi_A\left(\frac{I_C - I_B}{\sqrt{3}}\right),$$

and the summing circuit means derives the output torque signal $$T=\left(\frac{\Psi_C - \Psi_B}{\sqrt{3}}\right)I_A - \Psi_A\left(\frac{I_C - I_B}{\sqrt{3}}\right)$$

representative of the actual value of the torque developed by the motor.

26. A torque measuring system according to claim 25, wherein the alternating current induction motor has one or more teeth formed in the stator thereof around which motor flux sensing coils are wound for deriving output voltage signals proportional to the rate of change of flux through the stator teeth.

27. A torque measuring system according to claim 26 wherein the flux signal processing circuit means includes integrating circuit means coupled to the output from the flux sensing coils for integrating the output voltage signals derived therefrom.

28. A torque measuring system according to claim 27, further including switching circuit means for reversing the polarity of the product output signal from said first and second multiplier circuit means in the summing circuit means to accommodate forward and reverse directional movement of the alternating current induction motor.

29. A torque measuring system according to claim 1, further including filter circuit means connected in the output of said summing circuit means for deriving the average value of the measured torque from the output of the summing circuit means and smoothing out harmonic torque values, torque ripple and other like effects produced in the output of the summing circuit means.

30. A torque measuring system according to claim 14, wherein the alternating current induction motor is a variable speed, variable voltage, three-phase alternating current induction traction motor.

31. A torque measuring system according to claim 24, wherein the motor flux sensing means comprises flux sensing coil means mounted on the motor stator for sensing the actual flux produced across the rotor-stator air gap of the motor and deriving an output motor flux voltage signal proportional thereto.

32. A torque measuring system according to claim 31, wherein flux signal processing circuit means includes integrating circuit means coupled to the output from the flux sensing coils for integrating the output voltage signals derived therefrom.

33. A torque measuring system according to claim 4, further including switching circuit means for reversing the polarity of the product output signal from said first and second multiplier circuit means in the summing circuit means to accommoate forward and reverse directional movement of the alternating current induction motor.

34. In a torque regulating alternating current induction motor control system comprising torque feedback circuit means for deriving an actual value of torque feedback control signal, power converter circuit means supplying power to said induction motor at a desired stator excitation frequency, and feedback control loop means responsive to said actual value of torque feedback control signal and controlling the operation of said power converter circuit means to vary said stator excitation frequency for maintaining operation of the induction motor at a controlled value of torque, improved torque feedback circuit means comprising motor flux sensing means for sensing the actual flux induced in the induction motor and deriving output motor flux signals, flux signal processing circuit means coupled to said motor flux sensing means for deriving from said output motor flux signals respective direct and quadrature axes flux signal components $\psi_d$ and $\psi_{qs}$, motor current sensing means for sensing the motor stator line current and deriving output motor current signals representative thereof, motor current signal processing circuit means coupled to said motor current sensing means for deriving from said output motor current signals respective direct and quadrature axes motor current signals $d_d$ and $e_{qs}$, first multiplier circuit means coupled to said flux signal processing circuit means and said motor current signal processing circuit means for multiplying said quadrature axis flux signal and said direct axis motor current signal and deriving an output ($\psi_{qs}i_d$) representative of their product, second multiplier circuit means coupled to said flux signal processing circuit means and said motor current signal processing circuit means for multiplying said direct axis flux signal and said quadrature axis motor current signal and deriving an output ($\psi_d i_{qs}$) representative of their product, and summing circuit means coupled to said first and second multiplier circuit means for summing together the outputs thereof and deriving an actual value of torque feedback control signal $T=(\psi_d i_{qs}-\psi_{qs}i_d)K$ representative of the actual value of the torque developed by the motor.

* * * * *

UNITED STATES PATENT OFFICE
CERTIFICATE OF CORRECTION

Patent No. 4,023,083           Dated May 10, 1977

Inventor(s) Allan B. Plunkett

It is certified that error appears in the above-identified patent and that said Letters Patent are hereby corrected as shown below:

Column 17, line 39, delete "$(\psi_9 i_{ds})$" and substitute -- $(\psi_q i_{ds})$ --

Column 18, line 38, delete "commmand" and substitute -- command --

Column 18, line 45, after "windings" insert -- , --

Column 20, line 10, insert "motor" between "value" and "flux"

Column 21, line 2, delete "8" and substitute -- 13 --

Column 21, line 3, delete "," after "comprises"

Column 22, line 17, after "windings" insert -- , --

Column 23, line 36, delete "first" (second occurrence)

Column 23, line 59, delete "$(\phi_A)$" and substitute -- $(\psi_A)$ --

Column 24, line 9, delete "the" and substitute -- a --

Column 24, line 51, delete "1" and substitute -- 28 --

Column 24, line 60, delete "14" and substitute -- 27 --

UNITED STATES PATENT OFFICE
CERTIFICATE OF CORRECTION

Patent No. 4,023,083      Dated May 10, 1977

Inventor(s) Allan B. Plunkett

It is certified that error appears in the above-identified patent and that said Letters Patent are hereby corrected as shown below:

Column 25, line 6, delete "4" and substitute -- 24 --

Column 25, line 10, delete "accommoate" and substitute -- accommodate --

Column 26, line 10, delete "$d_d$ and $e_{qs}$" and substitute -- $i_d$ and $i_{qs}$ --

Signed and Sealed this thirtieth Day of August 1977

[SEAL]

Attest:

RUTH C. MASON
*Attesting Officer*

C. MARSHALL DANN
*Commissioner of Patents and Trademarks*